United States Patent
Wiegel et al.

(10) Patent No.: US 10,302,295 B2
(45) Date of Patent: May 28, 2019

(54) ILLUMINATING FANS FOR LOADING DOCKS

(71) Applicants: Aaron J. Wiegel, Benton, WI (US); David Swift, Dubuque, IA (US); Jason Dondlinger, Bellevue, IA (US); Joe Korman, Dubuque, IA (US); Lucas I. Paruch, Dubuque, IA (US); Ronald P. Snyder, Dubuque, IA (US); Tony Duesing, Bellevue, IA (US)

(72) Inventors: Aaron J. Wiegel, Benton, WI (US); David Swift, Dubuque, IA (US); Jason Dondlinger, Bellevue, IA (US); Joe Korman, Dubuque, IA (US); Lucas I. Paruch, Dubuque, IA (US); Ronald P. Snyder, Dubuque, IA (US); Tony Duesing, Bellevue, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 15/787,551

(22) Filed: Oct. 18, 2017

(65) Prior Publication Data

US 2019/0113218 A1    Apr. 18, 2019

(51) Int. Cl.
*F21V 33/00* (2006.01)
*F21V 29/61* (2015.01)
(Continued)

(52) U.S. Cl.
CPC .............. *F21V 29/61* (2015.01); *F04D 25/06* (2013.01); *F04D 25/08* (2013.01); *F04D 27/00* (2013.01);
(Continued)

(58) Field of Classification Search
CPC .............. F21Y 2115/10; F21Y 2101/00; F21Y 2105/10; F21V 33/0096; F21V 29/673;
(Continued)

(56) References Cited

U.S. PATENT DOCUMENTS

| 2,538,655 A | 1/1951 | Preston |
|---|---|---|
| 3,275,878 A | 9/1966 | Wilbanks |

(Continued)

FOREIGN PATENT DOCUMENTS

| EP | 2019252 | 1/2009 |
|---|---|---|
| GB | 2123132 | 1/1984 |

(Continued)

OTHER PUBLICATIONS

International Searching Authority, "International Search Report and Written Opinion," issued in connection with International Application No. PCT/US2018/056052, dated Feb. 1, 2019, 18 pages.

*Primary Examiner* — Thien M Le
(74) *Attorney, Agent, or Firm* — Hanley, Flight & Zimmerman, LLC

(57) ABSTRACT

Illuminating fans for loading docks are disclosed. An example illuminating fan includes a housing defining an airflow chamber and an electrical chamber divided by an internal wall of the housing. The illuminating fan also includes a fan wheel mounted for rotation within the airflow chamber. The fan wheel is driven by a fan motor to generate a current of air passing through the airflow chamber. The illuminating fan further includes a lamp supported by the housing. The lamp is wired to an electrical circuit at least partially contained within the electrical chamber.

34 Claims, 6 Drawing Sheets

(51) Int. Cl.
  *F21V 29/76* (2015.01)
  *H05B 37/02* (2006.01)
  *F21V 23/04* (2006.01)
  *F21V 3/00* (2015.01)
  *F21V 29/83* (2015.01)
  *F21V 25/10* (2006.01)
  *F04D 25/08* (2006.01)
  *F04D 25/06* (2006.01)
  *F04D 27/00* (2006.01)
  *F04D 29/70* (2006.01)
  *F04D 29/60* (2006.01)
  *F21V 29/89* (2015.01)
  *F21W 131/402* (2006.01)

(52) U.S. Cl.
  CPC ......... *F04D 29/601* (2013.01); *F04D 29/703* (2013.01); *F21V 3/00* (2013.01); *F21V 23/04* (2013.01); *F21V 25/10* (2013.01); *F21V 29/76* (2015.01); *F21V 29/83* (2015.01); *F21V 29/89* (2015.01); *F21V 33/0096* (2013.01); *H05B 37/0227* (2013.01); *F21W 2131/402* (2013.01)

(58) Field of Classification Search
  CPC .... F21V 29/677; F21V 29/773; F21V 19/006; F21V 23/009; F21V 23/023; F21V 23/0457; F21V 23/0471; F21V 29/61; F21V 29/76; F21V 23/04; F21V 3/00; F21V 29/83; F21V 25/10; F21V 29/89; F21W 2131/402
  USPC .......................................................... 362/96
  See application file for complete search history.

(56) References Cited

U.S. PATENT DOCUMENTS

| | | | |
|---|---|---|---|
| 4,424,006 A | 1/1984 | Armbruster | |
| D296,369 S | 6/1988 | Harvey | |
| 4,973,016 A | 11/1990 | Hertenstein | |
| D327,131 S | 6/1992 | Vrancart et al. | |
| 5,171,086 A | 12/1992 | Baloochi | |
| 5,709,458 A | 1/1998 | Metz | |
| 5,791,763 A * | 8/1998 | Kam-Hoi | F04D 25/08 320/115 |
| 7,101,064 B2 | 9/2006 | Ancel | |
| D542,943 S | 5/2007 | Wang | |
| D546,980 S | 7/2007 | Lo | |
| D549,854 S | 8/2007 | Takahashi | |
| D566,300 S | 4/2008 | Lo | |
| D582,578 S | 12/2008 | Tsai et al. | |
| D593,223 S | 5/2009 | Komar | |
| D599,931 S | 9/2009 | van Klinken | |
| 7,823,239 B2 | 11/2010 | Hochstein et al. | |
| D647,646 S | 10/2011 | Tsung | |
| D664,272 S | 7/2012 | Lee | |
| 8,366,301 B2 | 2/2013 | Hudson et al. | |
| D683,883 S | 6/2013 | Yorio et al. | |
| D693,947 S | 11/2013 | Wiegel et al. | |
| D701,640 S | 3/2014 | Wiegel et al. | |
| D702,397 S | 4/2014 | Wiegel et al. | |
| 9,255,699 B2 | 2/2016 | Wiegel et al. | |
| 2002/0037098 A1 | 3/2002 | Beaty et al. | |
| 2002/0045420 A1 | 4/2002 | Taillon | |
| 2003/0067767 A1 | 4/2003 | Liu | |
| 2003/0151912 A1 | 8/2003 | Ancel | |
| 2004/0114921 A1 | 6/2004 | Braun et al. | |
| 2005/0168999 A1 | 8/2005 | Sommers et al. | |
| 2005/0260943 A1 | 11/2005 | Snyder et al. | |
| 2006/0049615 A1* | 3/2006 | Day | F04D 25/08 280/655.1 |
| 2006/0213672 A1* | 9/2006 | Mohr | A62C 3/02 169/24 |
| 2008/0010757 A1 | 1/2008 | Hochstein et al. | |
| 2009/0116961 A1* | 5/2009 | Todd, Jr. | F04D 25/088 416/5 |
| 2009/0147120 A1 | 6/2009 | Kurane | |
| 2010/0052549 A1 | 3/2010 | Hudson et al. | |
| 2010/0075588 A1* | 3/2010 | Haneline | F04D 29/526 454/118 |
| 2010/0146719 A1 | 6/2010 | Swessel et al. | |
| 2010/0201267 A1 | 8/2010 | Bourquin et al. | |
| 2010/0240418 A1 | 9/2010 | Matoba | |
| 2010/0291858 A1 | 11/2010 | Toy | |
| 2010/0301773 A1 | 12/2010 | Chemel et al. | |
| 2011/0001957 A1 | 1/2011 | Braune et al. | |
| 2011/0304840 A1 | 12/2011 | Hsu et al. | |
| 2014/0225509 A1 | 8/2014 | Wiegel et al. | |
| 2015/0176834 A1 | 6/2015 | Avedon | |
| 2016/0169498 A1* | 6/2016 | Lei | F21V 29/677 362/234 |
| 2017/0074503 A1 | 3/2017 | Horng et al. | |
| 2017/0144645 A1* | 5/2017 | Metz | B60T 17/22 |
| 2017/0168531 A1* | 6/2017 | Casparian | G06F 1/206 |

FOREIGN PATENT DOCUMENTS

| | | |
|---|---|---|
| JP | 2011149300 | 8/2011 |
| WO | 2009003279 | 1/2009 |
| WO | 2014123733 | 8/2014 |
| WO | 2015142871 | 9/2015 |

* cited by examiner

ILLUMINATING FANS FOR LOADING DOCKS

FIELD OF THE DISCLOSURE

This patent generally pertains to truck loading dock equipment and more specifically to illuminating fans for loading docks.

BACKGROUND

A typical loading dock of a building includes an exterior doorway with an elevated platform for transferring cargo to and from a vehicle, such as a truck or trailer. Loading docks often have various equipment to facilitate the loading and unloading operations. Examples of such equipment include dock levelers, vehicle restraints, weather barriers, lights for illuminating the vehicle's cargo bay, and fans for ventilating the cargo bay.

Common dock levelers include a deck or ramp that is pivotally hinged along its back edge to vary the height of its front edge. A retractable extension plate or lip pivots or translates outward from the deck's front edge to span the gap between the rear of the vehicle and the front edge of the deck. The deck and lip provide a bridge between the dock's elevated platform and the vehicle's bed so that personnel and material handling equipment can readily transfer cargo to and from the vehicle.

A hook-style vehicle restraint is often used to help restrain the vehicle at a safe parked position at the dock during loading and unloading operations. Such vehicle restraints have a hook that pivots or otherwise travels up and down to selectively engage and release the vehicle's rear impact guard (sometimes known as a RIG or ICC bar). A rear impact bar is a beam that extends horizontally across the rear of a vehicle, below the bed of the truck or trailer. Its primary purpose is to help prevent an automobile from under-riding the vehicle in a rear-end collision. A rear impact bar, however, also provides a convenient, sturdy structure for a hook-style restraint to reach up in front of the bar to obstruct the bar's movement away from the dock.

To help shield against weather while the vehicle is being serviced at the dock, some type of seal is usually installed around the perimeter of the building's exterior doorway. Such seals are typically installed along the upper and side edges of the doorway to help seal any air gaps that may otherwise exist between the face of the building and the rear of the vehicle. The dock leveler's lip resting upon the floor of the vehicle's cargo bay is often relied upon for sealing most of the doorway's lower edge.

During loading and unloading operations, a lamp mounted near the building's doorway can be used for illuminating the vehicle's cargo bay. Usually some type of articulated bracket supports the lamp, so the lamp's position can be adjusted to properly aim the light when in use or to move the lamp to a nonobstructing, stored position when the lamp is not in use. Depending on the temperature within the cargo bay, sometimes a fan is also installed near the building's doorway to blow ventilating air into the vehicle's cargo bay.

DETAILED DESCRIPTION

Figure 1:
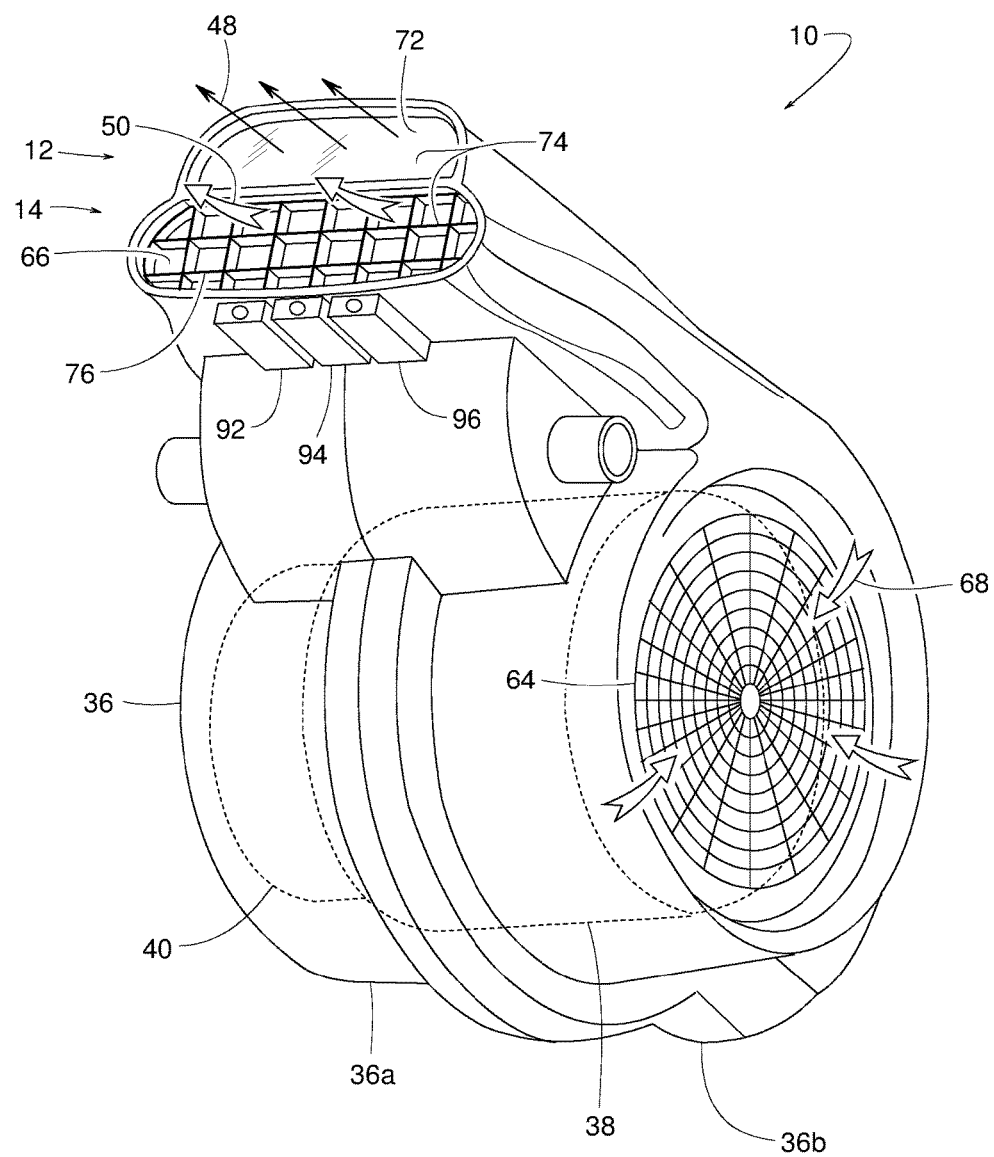
FIG. 1 is a perspective view of an example illuminating fan constructed in accordance with the teachings disclosed herein.

Example illuminating fans for use at vehicle loading docks that integrate both a lamp and a fan are disclosed. While cargo is being transferred to or from the cargo bay of a vehicle parked at the dock, the example lamp may illuminate the cargo bay and/or the fan may ventilate the cargo. To prevent the lamp form overheating, some example illuminating fans include a heat sink that transfers heat from the lamp to a current of air generated by the fan. In some examples, the illuminating fan includes a housing with an electrical chamber that contains the lamp and an airflow chamber that contains the fan. A dividing wall of relatively low thermal conductivity separates the two chambers, while the heat sink of greater thermal conductivity provides a heat transfer path through the wall. When the vehicle requires lighting but no ventilation, sometimes the fan still runs, but at very low speed, just to cool the lamp.

FIGS. 1, 2 and 4-6 show an example illuminating fan 10 that includes both a lamp section 12 and a fan section 14. FIG. 3 shows the illuminating fan's various operating modes for providing different combinations of illumination and ventilation of a vehicle 16 (e.g., truck, trailer, etc.) parked at a loading dock 18. The illuminating fan 10 is particularly useful in selectively illuminating and/or ventilating the vehicle's cargo bay 20 during loading and unloading operations at the dock 18. Example operating modes include an inactive mode 22, a full power mode 24, a lighting mode 26, a ventilating mode 28, an intermediate lighting mode 30, an intermediate ventilating mode 32, and an intermediate power mode 34.

Figure 2:
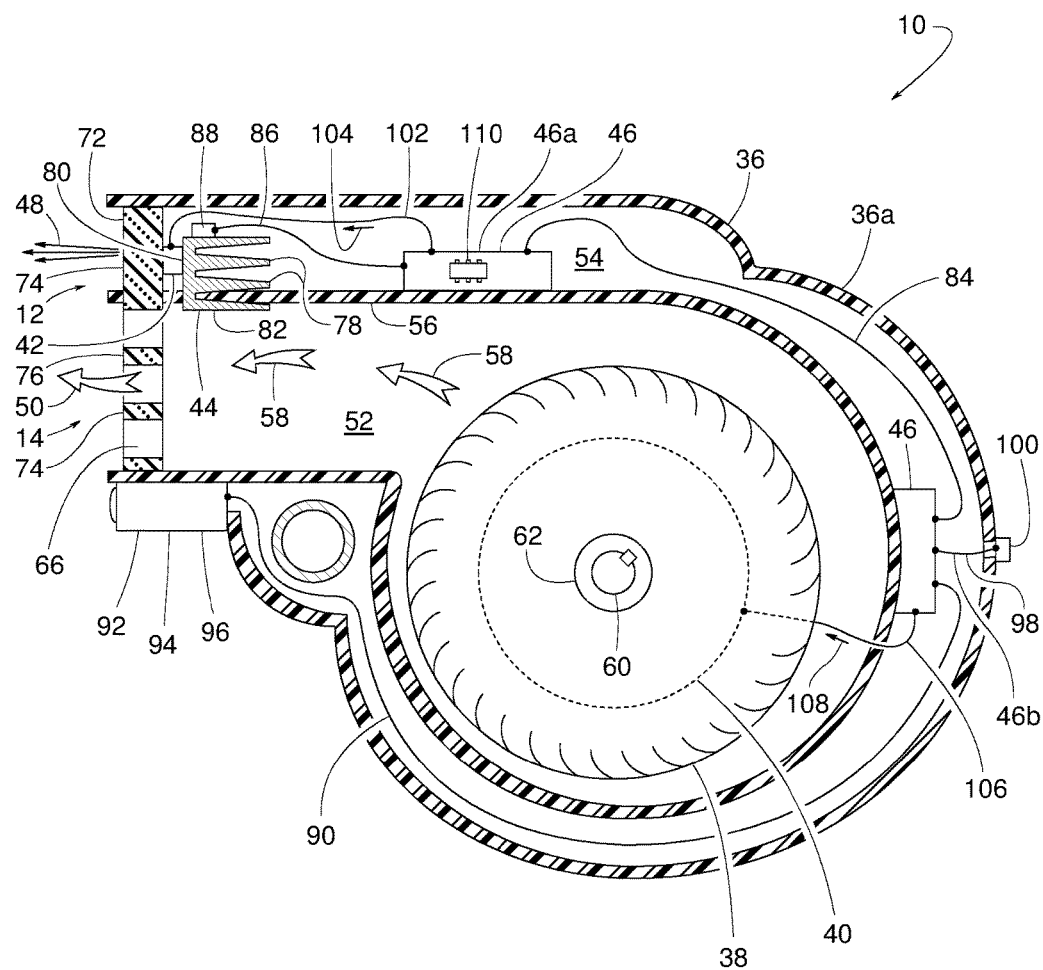
FIG. 2 is a cross-sectional right side view of the example illuminating fan shown in FIG. 2.
Figure 3:
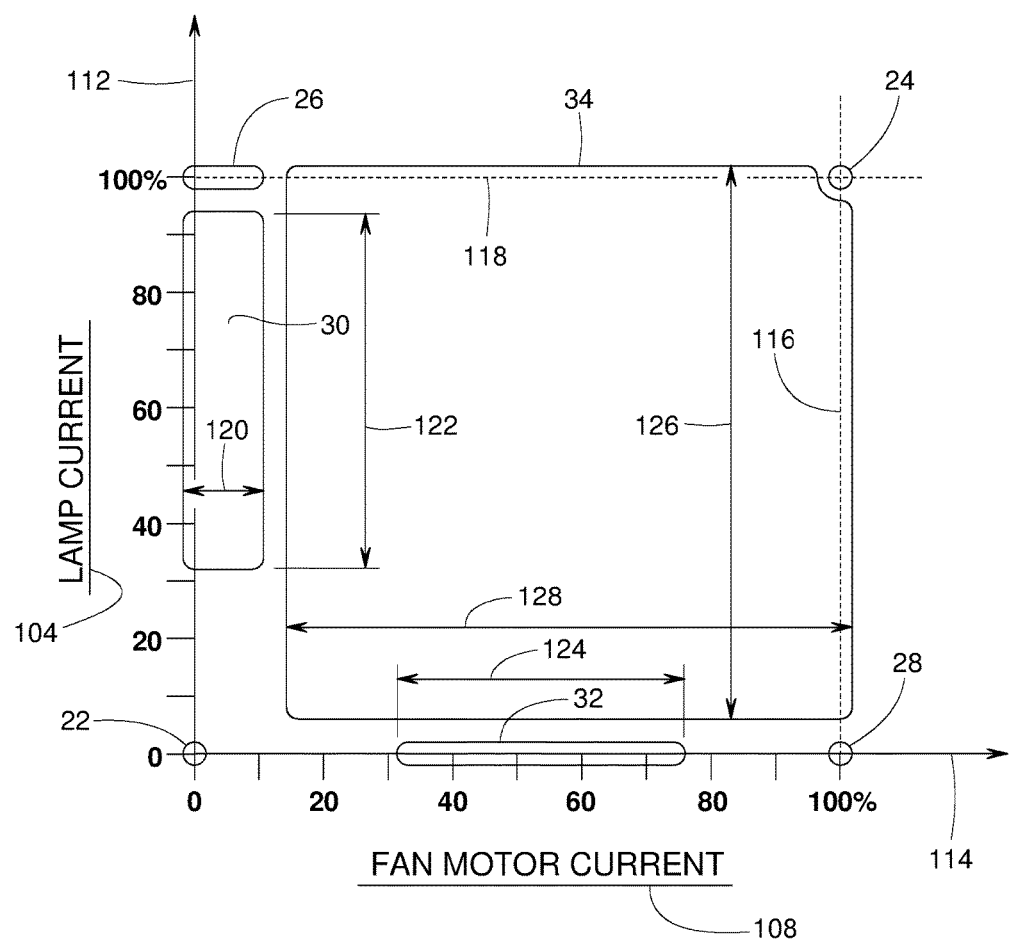
FIG. 3 is a diagram showing various example operating modes of the example illuminating fan shown in FIGS. 1 and 2.

Some examples of the illuminating fan 10 are constructed as shown in FIGS. 1 and 2. In this illustrated example, the illuminating fan 10 comprises a housing 36, a fan wheel 38, a fan motor 40, a lamp 42, a heat sink 44, and an electrical circuit 46. The lamp section 12 and the fan section 14 sharing the same housing 36 allows both of the sections 12, 14 to be aimed simultaneously. Plus, the lamp 42 projecting a light beam 48 provides visible means for aiming air 50 discharged from the fan section 14.

In this example, the housing 36 comprises a first shell 36a attached to a second shell 36b. In some examples, the shells 36a, 36b are plastic injection molded of a plastic material (e.g., acrylonitrile butadiene styrene, polycarbonate, polyethylene, polypropylene, polystyrene, high impact polystyrene, etc.), which has a relatively low electrical conductivity for safely housing internal electrical components. Such plastics inherently have a relatively low thermal conductivity as well. As shown in the illustrated example, the housing 36 defines an airflow chamber 52 and an electrical chamber 54 between the shells 36a, 36b. To provide a smooth air flow path through the airflow chamber 52 and to prevent airborne contaminants from entering the electrical chamber 54, a dividing wall 56 of the housing 36 separates the two chambers 52, 54. In some examples, the dividing wall 56 is plastic injection molded as an integral feature of the shells 36a, 36b. The housing 36 containing both the fan section 14 and the lamp section 12 simplifies wiring and installation of the illuminating fan 10.

To generate a current of air 58 for ventilating the vehicle 16, the fan wheel 38 is mounted for rotation within the airflow chamber 52. An output shaft 60 of the fan motor 40 is keyed or otherwise fastened to a hub 62 of the fan wheel 38. The fan motor 40, which may also be housed within the airflow chamber 52, rotates the fan wheel 38. The rotation of the fan wheel 38 centrifugally forces the current of air 58 from an inlet 64 of the housing 36, through the airflow chamber 52, and out through a discharge outlet 66. The inlet 64 of the housing 36 draws indoor air 68 from within a building 70 associated with the loading dock 18 and discharges and directs the air into the vehicle's cargo bay 20 (e.g., inside a trailer of the vehicle 16).

In some examples, to project the light beam 48 for illuminating the cargo bay 20 of the vehicle 16, the lamp 42 is mounted within the electrical chamber 54, just behind a protective lens 72. In the illustrated example, the lens 72 is attached to the housing 36 near the discharge outlet 66. The lamp 42 is schematically illustrated to represent any electrically powered device for emitting light. Examples of the lamp 42 include an LED (light emitting diode), an incandescent bulb, a diffused laser, a fluorescent bulb, etc. In the illustrated example, an end piece 74 made of a monolithic (e.g., unitary), see-through plastic material includes not only the lens 72 but also includes a grill 76 at the discharge outlet 66. The term, "lens" refers to any part through which light can pass. Example lens shapes include flat, concave, convex and combinations thereof. The term, "see-through" refers to any material through which light can pass. Examples of "see-through" include transparent, translucent, tinted, and clear. The term, "grill" refers to any structure with apertures through which air can pass. Example grills include screens, grates, plurality of louvers, and registers.

To prevent a high intensity version of the lamp 42 from overheating in the rather confined space of the electrical chamber 54, particularly considering the relatively low thermal conductivity of the dividing wall 56, some examples of the illuminating fan 10 include the heat sink 44. The heat sink 44 is made of a metal material (e.g., aluminum, steel, brass, etc.) having a thermal conductivity that is greater than the thermal conductivity of the plastic material of the dividing wall 56 and the housing 36. In the illustrated example, the heat sink 44 is a monolithic piece of metal comprising a plurality of fins 78, a first surface 80, and a second surface 82. The first surface 80 is disposed within the electrical chamber 54 and is in contact with the lamp 42. The second surface 82 is disposed within the airflow chamber 52 and is in contact with the current of air 58 passing through the airflow chamber 52. The heat sink 44 draws heat from the lamp 42 and passes much of the heat onto the current of air 58, thereby reducing the lamp's temperature and prolonging the lamp's life. Additionally, in some examples, the fins 78 release some heat from the lamp 42 into areas of the electrical chamber 54 that are at a distance from the lamp 42. In the illustrated example, the heat sink 44 is mounted so as to conduct heat from the electrical chamber 54 to the airflow chamber 52 without creating a significant adverse air passageway or leak through the dividing wall 56 between the two chambers 52, 54. Using the fan's current of air 58 to cool the second surface 82 reduces the required size and weight of the heat sink 44.

In some examples, the electrical circuit 46 delivers electrical power to the lamp 42 and the fan motor 40. In FIG. 2, the electrical circuit 46 is schematically illustrated to include a relatively low voltage section 46a primarily for the lamp 42 and a higher voltage section 46b for the fan motor 40. In some examples, portions of the low and high voltage sections 46a, 46b overlap each other, as schematically represented by electrical line 84. Line 86 represents wiring for receiving feedback from a unit temperature sensor 88 that is in heat transfer relationship with the lamp 42, the heat sink 44, the housing 36, the dividing wall 56, the electric circuit 46, and/or electrical chamber 54. Line 90 represents wiring for receiving feedback signals from a trailer temperature sensor 92, a touchless sensor 94, and/or a light sensor 96. Line 98 represents wiring for receiving feedback from an indoor temperature sensor 100.

Line 102 of FIG. 2 schematically represents wiring conveying electrical lamp current 104 for powering the lamp 42, and line 106 schematically represents wiring conveying electrical fan current 108 for powering the fan motor 40. In some examples, the lamp current 104 can vary to adjust the brightness of the lamp 42, and the fan current 108 varies in response to adjusting the speed of the fan motor 40 by known conventional motor control means examples of which include triac phase shift control, voltage control, inverter voltage control, selective resistor control, variable voltage transformer, brushless DC motor control, electronically commuted motor control, tapped windings selection, and various combinations thereof.

In some examples, the electrical circuit 46 includes a controller 110 that provides control and logic functions for the various operating modes of the illuminating fan 10. The controller 110 is schematically illustrated to represent any electrical device that provides certain outputs in response to various inputs. Examples of the controller 110 include a microcomputer, a microprocessor, a programmable integrated circuit chip, etc.

The various operating modes allow the illuminating fan 10 to run the fan section 14 alone when only ventilation is needed or to run the lamp section 12 alone when only illumination is needed or to run the fan and lamp sections 12, 14 concurrently when both illumination and ventilation are needed. In some examples, when only illumination is needed, the fan motor 40 is run at a relatively low speed just to prevent the lamp 42 from overheating. The diagram illustrated in FIG. 3 shows additional details of various example operating modes.

In FIG. 3, various operating modes are plotted on a graph with the lamp current 104 on a vertical axis 112 and the fan current 108 (i.e., electrical current to the fan motor 40) on a horizontal axis 114. The lamp and fan currents 104, 108 are plotted as a percentage of their maximum current levels. As used herein, maximum current refers to an upper limit on current defined by operational needs and safety considerations and not necessarily an absolute maximum current possible. The inactive mode 22 is when the illuminating fan 10 is basically de-energized, wherein both the lamp current 104 and the fan current 108 is zero or substantially zero. The full power mode 24 is when the electrical circuit 46 delivers a hundred percent of a maximum (safe) fan current 116 to the fan motor 40 and delivers a hundred percent of a maximum (safe) lamp current 118 to the lamp 42. The full power mode 24 is for maximum illumination and maximum ventilation.

The lighting mode 26 is used when loading or unloading operations at the dock 18 require maximum lighting but with no need for ventilation. In this case, the electrical circuit 46 delivers the maximum lamp current 118 to the lamp 42 and a relatively low fan current 120 to the fan motor 40 for cooling the lamp 42. In cases where the lamp 42 stays sufficiently cool without overheating, the relatively low fan current 120 can be zero. In other cases, however, where the lamp 42 might overheat, the relatively low fan current 120 is set just high enough to create minimal airflow sufficient for cooling the lamp 42. In some examples, the relatively low fan current 120 is within a range of greater than or equal to zero but less than twenty percent of the maximum fan current 116. For instance, in the example illustrated in FIG. 3, the relatively low fan current 120 is no more than about ten percent of the maximum fan current 116. In some examples, the relatively low fan current 120 may be provided to the fan motor 40 at intermittent intervals and/or at varying current levels over time to, for example, intermittently cool the lamp 42 and/or to vary the rate at which the lamp 42 is cooled.

The ventilating mode 28 is used when loading or unloading operations at the dock 18 require maximum ventilation but with no need for illumination. In this case, the electrical circuit 46 delivers the maximum fan current 116 to the fan motor 40 and the minimum lamp current to the lamp 42, wherein the minimum lamp current is substantially equal to zero (i.e., the lamp 42 is de-energized).

In some examples, the illuminating fan 10 further includes the intermediate lighting mode 30. The intermediate lighting mode 30 is similar to the lighting mode 26 but with reduced current to the lamp 42 for either less illumination or to prevent the lamp 42 from overheating. In some examples, the electrical circuit 46 delivers a moderate lamp current 122 to the lamp 42, wherein the moderate lamp current 122 is at least twenty percent of the maximum lamp current 118 but less than a hundred percent of the maximum lamp current 118, while the electrical circuit 46 delivers the relatively low fan current 120 to the fan motor 40, wherein the relatively low fan current 120 is just enough to meet the cooling needs of the lamp 42. In the example illustrated in FIG. 3, the moderate lamp current 122 is at least about thirty-two percent of the maximum lamp current 118. In some examples, the fan current 108 is zero to conserve energy while the lamp current 104 is reduced to prevent the lamp 42 from overheating.

In addition or alternatively, some examples of the illuminating fan 10 have the intermediate ventilating mode 32, which provides moderate ventilation with no illumination. With the intermediate ventilating mode 32, the flow rate of the current of air 58 is reduced, as the electrical circuit 46 delivers a moderate fan current 124 to the fan motor 40. The moderate fan current 124 is within some range less than the maximum fan current 116.

In addition or alternatively, some examples of the illuminating fan 10 have the intermediate power mode 34. The intermediate power mode 34 provides a combination of illumination and ventilation for covering a broad range of possible conditions at the dock 18. With the intermediate power mode 34, the electrical circuit 46 delivers an intermediate lamp current 126 to the lamp 42, wherein the intermediate lamp current 126 is greater than zero but no more than the maximum lamp current 118. At the same time, the electrical circuit 46 delivers an intermediate fan current 128 to the fan motor 40, wherein the intermediate fan current 128, in some examples, is at least twenty percent of the maximum fan current 116 but no greater than the maximum fan current 116. In the example illustrated in FIG. 3, the intermediate fan current 128 is at least about thirteen percent of the maximum fan current 116.

In addition or alternatively, the unit temperature sensor 88, the trailer temperature sensor 92, the indoor temperature sensor 100, the touchless sensor 94, the light sensor 96, and/or various dock equipment sensors (e.g., a door sensor 130, a vehicle restraint sensor 132, a dock leveler sensor 134, etc.) are used for enhancing the functionality of the illuminating fan 10. In some examples, the unit temperature sensor 88 senses the temperature of the lamp 42, the heat sink 44, the housing 36, the dividing wall 56, the electric circuit 46, and/or the electrical chamber 54 for the purpose of determining whether the lamp 42 might be getting too hot (e.g., the measured temperature exceeds a temperature threshold). Examples of the unit temperature sensor 88 include a thermistor, an RTD (resistance temperature detector), and a bimetallic switch.

In some examples, the controller 110 receives feedback from the unit sensor 88 and controls the fan motor 40 and/or the lamp 42 so as to prevent the lamp 42 from overheating. For example, the controller 110 sets the electrical fan current 108 to a non-zero value when a temperature measured by the unit temperature sensor 88 exceeds a threshold. In some examples, overheating is avoided by running the fan motor 40 at some minimal speed (e.g., less than twenty percent of full speed) during the lighting mode 26 or the intermediate lighting mode 30. In addition or alternatively, overheating is avoided by reducing the lamp current 104 to the moderate lamp current 122 during the intermediate lighting mode 30.

In addition or alternatively, the trailer temperature sensor 92, such as a pyrometer or infrared thermometer, senses the approximate temperature within the trailer cargo bay 20 of the vehicle 16. Based on feedback from the trailer temperature sensor 92, the controller 110 turns the fan motor 40 on or off accordingly. In addition or alternatively, the controller 110 controls the fan motor 40 based on a comparison of feedback from the trailer temperature sensor 92 and the indoor temperature sensor 100, wherein the indoor temperature sensor 100 senses the temperature of the indoor air 68 within the building 70. For instance, in some examples, the controller 110 controls the fan motor 40 based on a temperature differential as sensed by the trailer temperature sensor 92 and the indoor temperature sensor 100. Specifically, in some examples, the controller 110 energizes the fan motor 40 when the trailer temperature is much colder or much warmer (e.g., more than 5° F. different, more than 10° F. different, etc.) than the indoor air temperature.

In addition or alternatively, some examples of the illuminating fan 10 include the touchless sensor 94 for sensing activity with the vehicle's cargo bay 20. The touchless sensor 94 is schematically illustrated to represent any device for detecting the presence or movement of a body or object without having to actually contact the body or object. Examples of the touchless sensor 94 operate under various known principles, examples of which include active infrared, passive infrared, ultrasonic, radar, microwave, laser, electromagnetic induction, pressure pad, ultra-IR LED, time-of-flight pulse ranging technology, photoelectric eye, thermal, video analytics, and various combinations thereof. In some examples, the controller 110 deactivates the illuminating fan 10 if the touchless sensor 94 determines, via its line of sight 136, that no recent activity has occurred within the cargo bay 20 (e.g., no activity within the last hour or some other predetermined period).

In some examples, the touchless sensor 94 is a motion sensor capable of detecting a direction of motion of objects (e.g., people, material handling equipment, etc.) within the cargo bay 20 of the vehicle 16. In some such examples, the detected direction of movement may be provided as a feedback signal to the controller 110 to control a brightness of the lamp 42. In particular, in some examples, when movement within the cargo bay 20 is detected in a direction moving away from the illuminating fan 10 (e.g., moving farther into the cargo bay 20), the controller 110 may place the lamp 42 in a first illuminating mode (associated with a first current level). Further, when movement within the cargo bay 20 is detected in a direction moving towards the illuminating fan 10 (e.g., moving in a direction to exit the out of the cargo bay 20 and enter into the building 70), the controller 110 may place the lamp 42 in a second illuminating mode (associated with a second current level) that is less bright than the first illuminating mode. In some examples, the first current level associated with the first illuminating mode corresponds to the maximum (safe) lamp current 118. In some examples, the second current level associated with the second illuminating mode is greater than zero but less than the maximum lamp current 118. The change in brightness of the lamp 42 based on the direction of movement is to provide a relatively high amount of illumination when a person is entering the cargo bay while reducing the brightness of the lamp when the person is moving in a direction towards the lamp 42 to exit the cargo bay 20 of the vehicle 16. In this manner, the person is enabled to see the interior of the vehicle trailer when entering the cargo bay 20 (e.g., moving into the vehicle to retrieve or load materials with a forklift or other material handling equipment) without projecting excessively bright light directly into the eyes of the person when they are exiting the cargo bay 20 (e.g., moving out of the vehicle after having picked up or dropped off materials).

Figure 4:
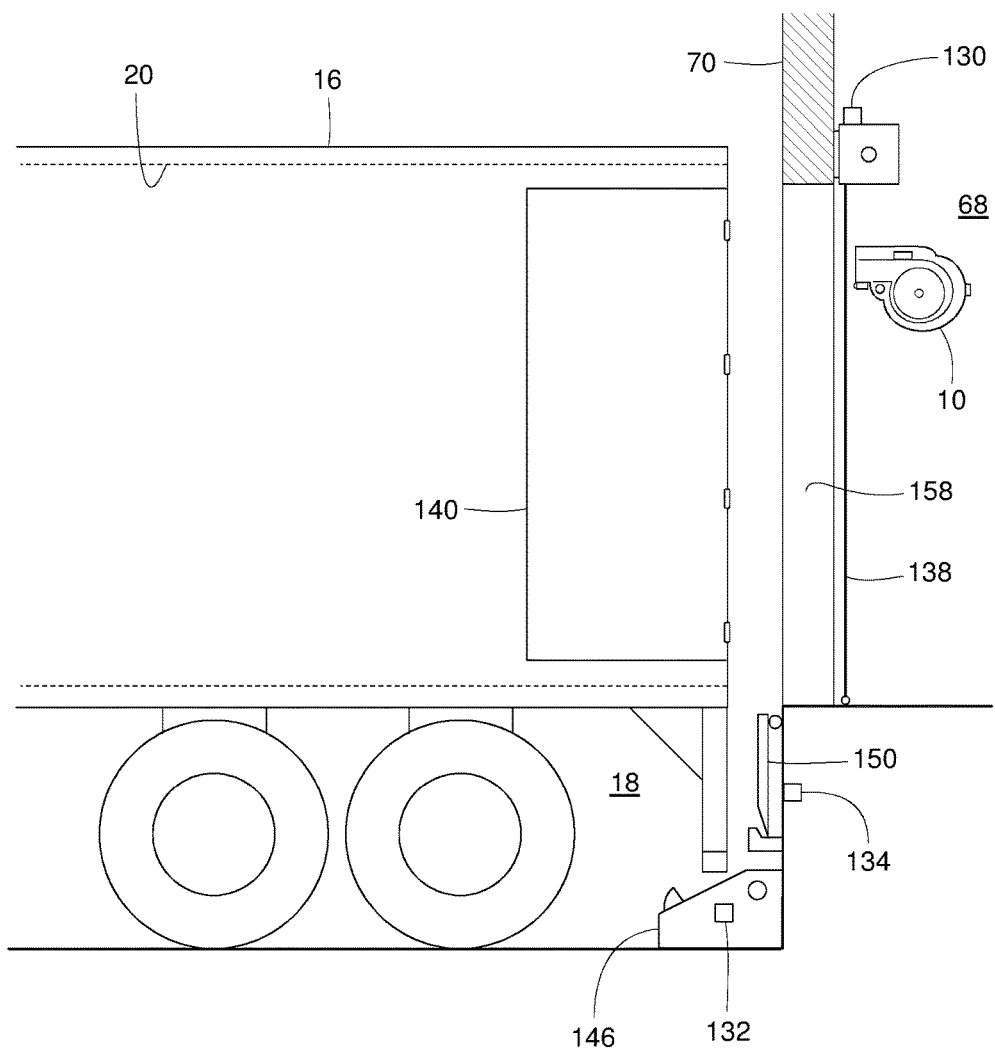
FIG. 4 is a side view of the example illuminating fan shown in FIGS. 1 and 2, wherein the illuminating fan is shown as part of an example loading dock arrangement in accordance with the teachings disclosed herein.
Figure 5:
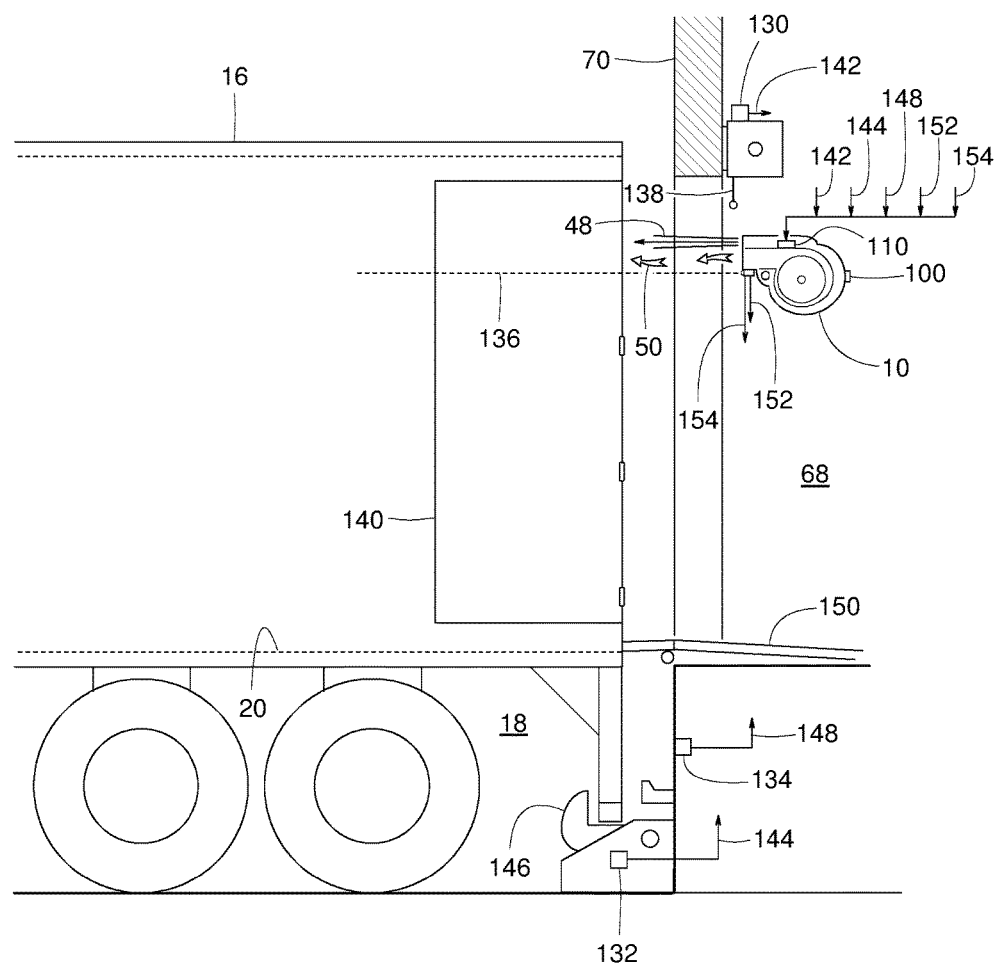
FIG. 5 is a side view similar to FIG. 4 but showing the example loading dock arrangement in a different operating mode.
Figure 6:
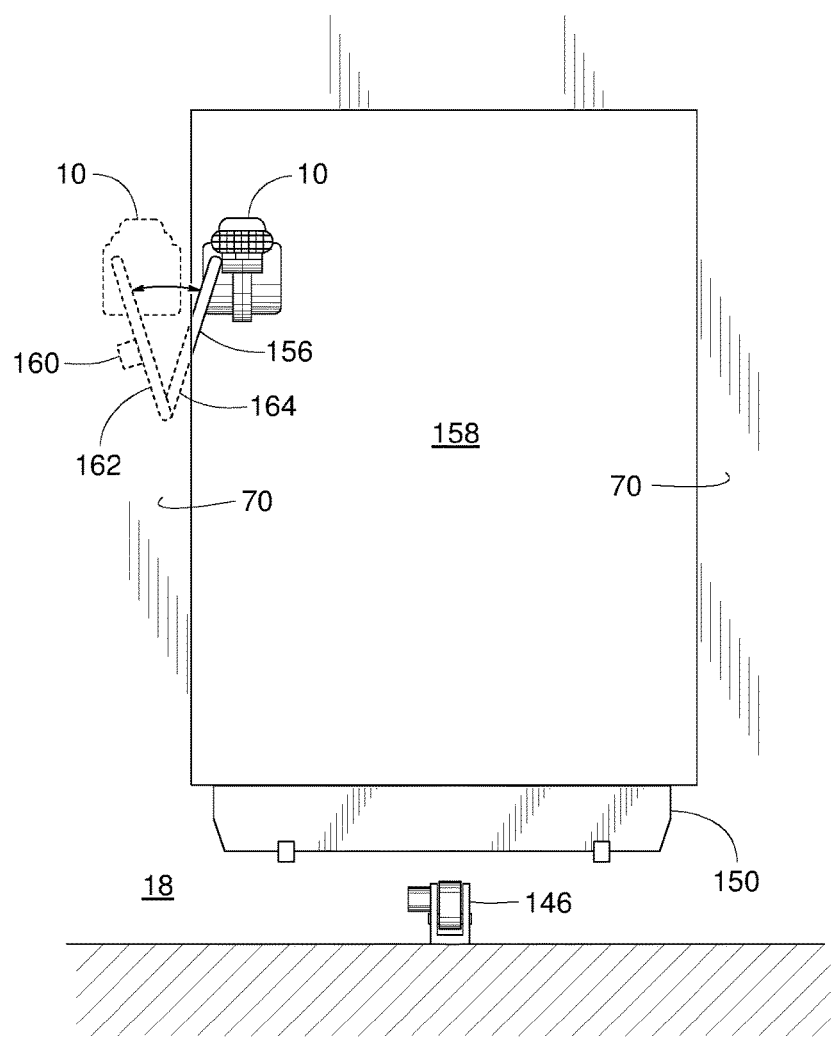
FIG. 6 is exterior view of the example loading dock of FIGS. 4 and 5 but with the vehicle omitted and showing the example illuminating fan with an example mounting arrangement constructed in accordance with the teachings disclosed herein.

FIGS. 4 and 5 show the touchless sensor 94 being additionally or alternatively used for determining whether a dock door 138 and/or a trailer door 140 is open. In this example, the controller 110 activates the lamp section 12 and/or the fan section 14 in response to the touchless sensor 94 detecting that the dock door 138 and the trailer door 140 are open. In some examples, the illuminating fan 10 includes a touchless sensor 94 to detect whether the dock door 138 and/or the trailer door 140 are open or closed and a separate touchless sensor 94 that serves as a motion sensor as described above.

In addition or alternatively, some examples of the illuminating fan 10 include the light sensor 96 for sensing the amount of light in the vehicle's cargo bay 20. The light sensor 96 is schematically illustrated to represent any device that provides a feedback signal that changes in response to visible electromagnetic energy. In some examples, to achieve a desired amount of illumination of the cargo bay 20, the controller 110 adjusts the lamp current 104 in response to feedback from the light sensor 96. This feature can be beneficial, as some vehicles, such as those with clear roofs, for example, are more naturally illuminated by ambient light than others.

In addition or alternatively, some examples of the illuminating fan 10 are controlled in response to one or more dock equipment sensors, such as the door sensor 130, the vehicle restraint sensor 132, and/or the dock leveler sensor 134. In some examples, the door sensor 130 provides a signal 142 in response to the dock door 138 being open, the vehicle restraint sensor 132 provides a signal 144 in response to a known vehicle restraint 146 engaging the vehicle 16, and the dock leveler sensor 134 provides a signal 148 in response to a known dock leveler 150 being in its extended position engaging the floor of the cargo bay 20. FIG. 4 shows the dock door 138 closed, the vehicle restraint 146 disengaged, and the dock leveler 150 retracted. FIG. 5 shows the dock door 138 open, the vehicle restraint 146 engaging the vehicle 16, and the dock leveler 150 extended. In some examples, the controller 110 energizes the lamp 42 and/or the fan motor 40 upon receiving one or more of the signals 142, 144, 148, as shown in FIG. 5. FIG. 5 also shows the controller 110, in some examples, receiving a feedback signal 152 from the light sensor 96 and/or a signal 154 from the touchless sensor 94.

In addition or alternatively, some examples of the illuminating fan 10 include an articulated bracket 156 for mounting the illuminating fan 10 to the building 70, proximate the doorway 158 of the loading dock 18. In some examples, an electrical switch 160 (e.g., a limit switch) senses whether the bracket 156 is in a retracted position 162 or an extended position 164. In some examples, the controller 110 automatically turns the lamp 42 on in response to the electrical switch 160 sensing that the bracket 156 moved from the retracted position 162 to the extended position 164 and automatically turns the lamp 42 off in response to the electrical switch 160 sensing that the bracket 156 is in the retracted position 162. This automated function makes the illuminating fan 10 easier to use.

Example 1 is an illuminating fan that includes a housing including a first shell attached to a second shell. The housing defines an airflow chamber between the first shell and the second shell. The housing also defines an electrical chamber between the first shell and the second shell. The illuminating fan includes a dividing wall between the airflow chamber and the electrical chamber. The illuminating fan includes a fan wheel mounted for rotation within the airflow chamber. The illuminating fan includes a fan motor coupled to the fan wheel. The fan wheel generates a current of air passing through the airflow chamber when the fan wheel is rotated by the fan motor. The illuminating fan includes a lamp supported by the housing. The illuminating fan includes an electrical circuit wired to the lamp. The electrical circuit being at least partially contained within the electrical chamber. The illuminating fan includes a metal heat sink in heat transfer relationship with the lamp and the airflow chamber through which the current of air is to pass.

Example 2 includes the subject matter of Example 1, wherein the metal heat sink is a monolithic piece including a plurality of fins, a first surface, and a second surface. The first surface is disposed within the electrical chamber and the second surface is disposed within the airflow chamber.

Example 3 includes the subject matter of Example 1, wherein the illuminating fan has selectively an inactive mode, a full power mode, a lighting mode, and a ventilating mode such that: in the inactive mode, the lamp and the fan motor are de-energized; in the full power mode, the lamp draws a maximum safe lamp current while the fan motor draws a maximum safe fan current; in the lighting mode, the lamp draws the maximum safe lamp current while the fan motor draws a low fan current, where the low fan current is less than 20% of the maximum safe fan current; and in the ventilating mode, the fan motor draws the maximum f safe an current while the lamp draws a minimum lamp current, where the minimum lamp current is less than 20% of the maximum safe lamp current.

Example 4 includes the subject matter of Example 1, wherein the illuminating fan further includes a unit temperature sensor to sense a temperature of at least one of the metal heat sink, the lamp, the housing, the dividing wall, the electrical circuit, or the electrical chamber.

Example 5 includes the subject matter of Example 4, wherein a fan current drawn by the fan motor is greater than zero when the temperature sensed by the unit temperature sensor exceeds a threshold.

Example 6 includes the subject matter of Example 4, wherein the illuminating fan has a plurality of intermediate modes including an intermediate lighting mode, an intermediate ventilating mode, and an intermediate power mode such that: in the intermediate lighting mode, the lamp draws a moderate lamp current while the fan motor draws a low fan current, where the low fan current is less than 20% of a maximum safe fan current and the moderate lamp current is greater than a minimum lamp current but less than a maximum safe lamp current; in the intermediate ventilating mode, the fan motor draws a moderate fan current while the lamp draws the minimum lamp current, where the moderate fan current is greater than the low fan current but less than the maximum safe fan current; and in the intermediate power mode, the lamp draws an intermediate lamp current while the fan motor draws an intermediate fan current, where the intermediate lamp current is greater than the minimum lamp current but no greater than the maximum safe lamp current. The intermediate fan current is greater than the low fan current but no more than the maximum safe fan current.

Example 7 includes the subject matter of Example 6, wherein, during the intermediate lighting mode, the low fan current is greater than zero when the temperature sensed by the unit temperature sensor exceeds a threshold.

Example 8 includes the subject matter of Example 6, wherein the illuminating fan changes from the lighting mode to the intermediate lighting mode in response to the unit temperature sensor sensing a temperature that exceeds a threshold.

Example 9 includes the subject matter of Example 1, wherein the illuminating fan is part of a loading dock arrangement that includes a building with a doorway, a trailer parked at the doorway of the building, and a bracket mounting the illuminating fan to the building proximate the doorway. The illuminating fan further includes a trailer temperature sensor supported by the housing and being in temperature sensing relationship with the trailer.

Example 10 includes the subject matter of Example 9, wherein operation of the fan motor is in response to the trailer temperature sensor.

Example 11 includes the subject matter of Example 9, wherein the illuminating fan further includes an indoor temperature sensor supported by the housing and being in temperature sensing relationship with indoor air of the building. Operation of the fan motor is in response to a temperature differential between temperatures sensed by the trailer temperature sensor and the indoor temperature sensor.

Example 12 includes the subject matter of Example 1, wherein the illuminating fan is part of a loading dock arrangement that includes a building with a doorway. The illuminating fan further includes a bracket to connect the housing to the building proximate the doorway. The bracket has selectively a retracted position and an extended position. The illuminating fan further includes an electrical switch connected to the bracket and wired to the electrical circuit. The electrical switch selectively turns the lamp from off to on in response to the bracket moving from the retracted position to the extended position.

Example 13 includes the subject matter of Example 1, wherein the illuminating fan is part of a loading dock arrangement that includes a building with a doorway, a trailer parked at the doorway of the building, and a bracket mounting the illuminating fan to the building proximate the doorway. The illuminating fan further includes a light sensor to be supported by the housing and aimed toward the trailer to sense a degree to which the trailer is illuminated. The lamp is supplied a lamp current based on a feedback signal from the light sensor. The feedback signal varies based on the degree to which the trailer is illuminated.

Example 14 includes the subject matter of Example 1, wherein the illuminating fan is part of a loading dock arrangement that includes a building with a building door, a trailer parked at the building door, a trailer door on the trailer, and a bracket mounting the illuminating fan to the building. The illuminating fan further includes a touchless sensor to be supported by the housing and aimed toward the trailer, the touchless sensor providing a signal in response to detecting at least one of the trailer door being open or motion within the trailer. At least one of the lamp or the fan motor changes between being energized and de-energized in response to the signal.

Example 15 includes the subject matter of Example 1, wherein the illuminating fan is part of a loading dock arrangement that includes a building with a building door, and a bracket mounting the illuminating fan to the building. At least one of the lamp or the fan motor is energized in response to the building door opening.

Example 16 includes the subject matter of Example 1, wherein the illuminating fan is part of a loading dock arrangement that includes a building with a vehicle restraint adapted to selectively engage and release a vehicle parked at the building, and a bracket mounting the illuminating fan to the building. At least one of the lamp or the fan motor is energized in response to activation of the vehicle restraint.

Example 17 includes the subject matter of Example 1, wherein the illuminating fan further includes an end piece attached to the housing. The end piece is of a monolithic and see-through material. The end piece includes a lens and a grill, where light emitted from the lamp is to pass through the lens, and the current of air is to exit the airflow chamber through the grill.

Example 18 includes the subject matter of Example 1, wherein the illuminating fan further includes a motion sensor to detect a direction of motion of an object moving relative to the lamp. A brightness of the lamp is based on a motion feedback signal generated by the motion sensor.

Example 19 includes the subject matter of Example 18, wherein the motion feedback signal indicates whether the object is moving in a first direction away from the lamp or a second direction towards the lamp. The brightness of the lamp is greater when the object is moving in the first direction than when the object is moving in the second direction.

Example 20 is an illuminating fan for use at a loading dock arrangement that includes a building with a doorway, a trailer parked at the doorway of the building, and a bracket mounting the illuminating fan to the building proximate the doorway. The illuminating fan includes a housing defining an airflow chamber and an electrical chamber. The illuminating fan includes a fan wheel mounted for rotation within the airflow chamber. The fan wheel is driven by a fan motor to generate a current of air passing through the airflow chamber. The illuminating fan includes a lamp supported by the housing, the lamp wired to an electrical circuit at least partially contained within the electrical chamber. The illuminating fan includes a trailer temperature sensor supported by the housing and in temperature sensing relationship with the trailer. The illuminating fan includes an indoor temperature sensor supported by the housing and in temperature sensing relationship with indoor air of the building. Operation of the fan motor is in response to a temperature differential as sensed by the trailer temperature sensor and the indoor temperature sensor.

Example 21 includes the subject matter of Example 20, wherein the illuminating fan further includes a metal heat sink in heat transfer relationship with the lamp and the airflow chamber through which the current of air is to pass.

Example 22 includes the subject matter of Example 20, wherein the illuminating fan further includes a metal heat sink in heat transfer relationship with the lamp and the airflow chamber through which the current of air is to pass. The metal heat sink is a monolithic piece including a plurality of fins, a first surface, and a second surface. The first surface is disposed within the electrical chamber and the second surface is disposed within the airflow chamber.

Example 23 includes the subject matter of Example 20, wherein the illuminating fan further includes a metal heat sink in heat transfer relationship with the lamp and the airflow chamber through which the current of air is to pass. The illuminating fan further includes a unit temperature sensor in heat transfer relationship with at least one of the metal heat sink, the lamp, the housing, the electrical circuit, or the electrical chamber.

Example 24 includes the subject matter of Example 20, wherein the illuminating fan further includes a light sensor to be supported by the housing and aimed toward the trailer to sense a degree to which the trailer is illuminated. The lamp is supplied a lamp current based on a feedback signal from the light sensor, where the feedback signal varies based on the degree to which the trailer is illuminated.

Example 25 includes the subject matter of Example 20, wherein the illuminating fan further includes an end piece attached to the housing, the end piece being of a monolithic and see-through material. The end piece includes a lens and a grill, wherein light emitted from the lamp is to pass through the lens, and the current of air is to exit the airflow chamber through the grill.

Example 26 includes the subject matter of Example 20, wherein the illuminating fan further includes a motion sensor to generate a first motion feedback signal indicative of an object within the trailer moving in a first direction away from the lamp. The motion sensor generates a second motion feedback signal indicative of the object within the trailer moving in a second direction towards the lamp.

Example 27 includes the subject matter of Example 26, wherein the lamp is to draw a first current in response to the first motion feedback signal and to draw a second current in response to the second motion feedback signal, where the first current being greater than the second current.

Example 28 is an illuminating fan that includes a housing defining an airflow chamber and an electrical chamber divided by an internal wall of the housing. The illuminating fan further includes a fan wheel mounted for rotation within the airflow chamber, where the fan wheel to be driven by a fan motor to generate a current of air passing through the airflow chamber. The illuminating fan further includes a lamp supported by the housing, where the lamp wired to an electrical circuit at least partially contained within the electrical chamber.

Example 29 includes the subject matter of Example 28, wherein the illuminating fan further includes a metal heat sink in heat transfer relationship with the lamp and the airflow chamber through which the current of air is to pass. The illuminating fan further includes a unit temperature sensor in heat transfer relationship with at least one of the metal heat sink, the lamp, the housing, the electrical circuit, or the electrical chamber. The illuminating fan has selectively an inactive mode, a full power mode, a lighting mode, a ventilating mode, and a plurality of intermediate modes including an intermediate lighting mode, an intermediate ventilating mode, and an intermediate power mode such that: in the inactive mode, the lamp and the fan motor are de-energized; in the full power mode, the lamp draws a maximum safe lamp current while the fan motor draws a maximum safe fan current; in the lighting mode, the lamp draws the maximum safe lamp current while the fan motor draws a low fan current, wherein the low fan current is less than 20% of the maximum safe fan current, the low fan current being greater than zero when the unit temperature sensor senses a temperature that exceeds a threshold, and the low fan current being equal to zero when the unit temperature sensor does not sense the temperature exceeding the threshold; in the ventilating mode, the fan motor draws the maximum safe fan current while the lamp draws a minimum lamp current, wherein the minimum lamp current is less than 20% of the maximum safe lamp current; in the intermediate lighting mode, the lamp draws a moderate lamp current while the fan motor draws the low fan current, wherein the moderate lamp current is greater than the minimum lamp current but less than the maximum safe lamp current; in the intermediate ventilating mode, the fan motor draws a moderate fan current while the lamp draws the minimum lamp current, wherein the moderate fan current is greater than the low fan current but less than the maximum safe fan current; and in the intermediate power mode, the lamp draws an intermediate lamp current while the fan motor draws an intermediate fan current, wherein the intermediate lamp current is greater than the minimum lamp current but no greater than the maximum safe lamp current, and the intermediate fan current is greater than the low fan current but no more than the maximum safe fan current.

Example 30 includes the subject matter of Example 29, wherein the illuminating fan changes from the lighting mode to the intermediate lighting mode in response to the unit temperature sensor sensing a temperature that exceeds a threshold.

Example 31 includes the subject matter of Example 28, wherein the illuminating fan further includes a metal heat sink. The metal heat sink being a monolithic piece including a plurality of fins, a first surface, and a second surface. The first surface is disposed within the electrical chamber and the second surface is disposed within the airflow chamber.

Example 32 includes the subject matter of Example 28, wherein the illuminating fan is part of a loading dock arrangement that includes a building with a doorway, a trailer parked at the doorway of the building, and a bracket mounting the illuminating fan to the building proximate the doorway. The illuminating fan further includes a trailer temperature sensor supported by the housing and being in temperature sensing relationship with the trailer. The illuminating fan further includes an indoor temperature sensor supported by the housing and being in temperature sensing relationship with indoor air of the building, wherein operation of the fan motor is in response to a temperature differential as sensed by the trailer temperature sensor and the indoor temperature sensor.

Example 33 includes the subject matter of Example 28, wherein the illuminating fan further includes an end piece attached to the housing. The end piece being of a monolithic and see-through material. The end piece including a lens and a grill. Light emitted from the lamp is to pass through the lens, and the current of air is to exit the airflow chamber through the grill.

Example 34 includes the subject matter of Example 28, wherein the illuminating fan further includes a motion sensor to detect a direction of motion of an object moving relative to the lamp, a brightness of the lamp to vary based on whether the direction of motion of the object is moving towards the lamp or away from the lamp.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. An illuminating fan comprising:
    a housing including a first shell attached to a second shell, the housing defining an airflow chamber between the first shell and the second shell, the housing also defining an electrical chamber between the first shell and the second shell;
    a dividing wall between the airflow chamber and the electrical chamber;
    a fan wheel mounted for rotation within the airflow chamber;
    a fan motor coupled to the fan wheel, the fan wheel to generate a current of air passing through the airflow chamber when the fan wheel is rotated by the fan motor;
    a lamp supported by the housing;
    an electrical circuit wired to the lamp, the electrical circuit being at least partially contained within the electrical chamber;
    an end piece attached to the housing, the end piece including a lens and a grill, light emitted from the lamp to pass through the lens, the current of air to exit the airflow chamber through the grill; and
    a metal heat sink in heat transfer relationship with the lamp and the airflow chamber through which the current of air is to pass.

2. The illuminating fan of claim 1, wherein the metal heat sink is a monolithic piece including a plurality of fins, a first surface, and a second surface, the first surface being disposed within the electrical chamber and the second surface being disposed within the airflow chamber.

3. The illuminating fan of claim 1, wherein the illuminating fan has:
    an inactive mode in which the lamp and the fan motor are de-energized;
    a full power mode in which the lamp draws a maximum safe lamp current while the fan motor draws a maximum safe fan current;
    a lighting mode in which the lamp draws the maximum safe lamp current while the fan motor draws a low fan current, the low fan current is less than 20% of the maximum safe fan current; and
    a ventilating mode in which the fan motor draws the maximum safe fan current while the lamp draws a minimum lamp current, the minimum lamp current is less than 20% of the maximum safe lamp current.

4. The illuminating fan of claim 1, further including a unit temperature sensor to sense a temperature of at least one of the metal heat sink, the lamp, the housing, the dividing wall, the electrical circuit, or the electrical chamber.

5. The illuminating fan of claim 4, wherein a fan current drawn by the fan motor is greater than zero when the temperature sensed by the unit temperature sensor exceeds a threshold.

6. The illuminating fan of claim 4, wherein the illuminating fan has a plurality of intermediate modes including an intermediate lighting mode, an intermediate ventilating mode, and an intermediate power mode:
    in the intermediate lighting mode, the lamp draws a moderate lamp current while the fan motor draws a low fan current, wherein the low fan current is less than 20% of a maximum safe fan current and the moderate lamp current is greater than a minimum lamp current but less than a maximum safe lamp current;
    in the intermediate ventilating mode, the fan motor draws a moderate fan current while the lamp draws the minimum lamp current, wherein the moderate fan current is greater than the low fan current but less than the maximum safe fan current; and
    in the intermediate power mode, the lamp draws an intermediate lamp current while the fan motor draws an intermediate fan current, wherein the intermediate lamp current is greater than the minimum lamp current but no greater than the maximum safe lamp current, and the intermediate fan current is greater than the low fan current but no more than the maximum safe fan current.

7. The illuminating fan of claim 6, wherein, during the intermediate lighting mode, the low fan current is greater than zero when the temperature sensed by the unit temperature sensor exceeds a threshold.

8. The illuminating fan of claim 6, wherein the illuminating fan has a full lighting mode in which the lamp draws the maximum safe lamp current, the illuminating fan to change from the full lighting mode to the intermediate lighting mode in response to the temperature exceeding a threshold.

9. The illuminating fan of claim 1, wherein the illuminating fan is part of a loading dock arrangement for use with a building with a doorway, and a trailer parked at the doorway of the building, the loading dock arrangement including a bracket to mount the illuminating fan to the building proximate the doorway, the illuminating fan further including a trailer temperature sensor supported by the housing to be in temperature sensing relationship with the trailer.

10. The illuminating fan of claim 9, wherein the fan motor is to operate at a level based on an output of the trailer temperature sensor.

11. The illuminating fan of claim 9, further including an indoor temperature sensor supported by the housing to be in temperature sensing relationship with indoor air of the building, wherein the fan motor is to operate at a level based on a temperature difference between temperatures sensed by the trailer temperature sensor and the indoor temperature sensor.

12. The illuminating fan of claim 1, wherein the illuminating fan for use with a building with a doorway, the illuminating fan further including:
    a bracket to connect the housing to the building proximate the doorway, the bracket having a retracted position and an extended position; and
    an electrical switch carried by the bracket and in circuit with the electrical circuit, the electrical switch to turn the lamp from off to on in response to the bracket moving from the retracted position to the extended position.

13. The illuminating fan of claim 1, wherein the illuminating fan is part of a loading dock arrangement for use with a building with a doorway, and a trailer parked at the doorway of the building, the loading dock arrangement including a bracket to mount the illuminating fan to the building proximate the doorway, the illuminating fan further including a light sensor to be supported by the housing and aimed toward the trailer to sense a degree to which the trailer is illuminated, the lamp to receive a lamp current based on a feedback signal from the light sensor, the feedback signal to vary based on the degree to which the trailer is illuminated.

14. The illuminating fan of claim 1, wherein the illuminating fan is part of a loading dock arrangement for use with a building with a building door, a trailer parked at the building door, the trailer having a trailer door, the loading dock arrangement including a bracket to mount the illuminating fan to the building, the illuminating fan further including:
a touchless sensor to be supported by the housing and aimed toward the trailer, the touchless sensor to provide a signal in response to at least one of the trailer door being open or motion within the trailer; and
at least one of the lamp or the fan motor changing between being energized and de-energized in response to the signal.

15. The illuminating fan of claim 1, wherein the illuminating fan is part of a loading dock arrangement for use with a building with a building door, the loading dock arrangement including a bracket to mount the illuminating fan to the building, wherein at least one of the lamp or the fan motor are to be energized in response to the building door opening.

16. The illuminating fan of claim 1, wherein the illuminating fan is part of a loading dock arrangement for use with a building with a vehicle restraint adapted to selectively engage and release a vehicle parked at the building, the loading dock arrangement including a bracket to mount the illuminating fan to the building, at least one of the lamp or the fan motor to be energized in response to activation of the vehicle restraint.

17. The illuminating fan of claim 1, wherein the end piece includes a monolithic and see-through material.

18. The illuminating fan of claim 1, further including a motion sensor to detect a direction of motion of an object relative to the lamp, a brightness of the lamp to be based on a motion feedback signal generated by the motion sensor.

19. The illuminating fan of claim 18, wherein the motion feedback signal is to indicate whether the object is moving in a first direction away from the lamp or a second direction towards the lamp, the brightness of the lamp to be greater when the object is moving in the first direction than when the object is moving in the second direction.

20. An illuminating fan for use at a loading dock arrangement that includes a building with a doorway, a trailer parked at the doorway of the building, and a bracket mounting the illuminating fan to the building proximate the doorway, the illuminating fan comprising:
a housing defining an airflow chamber and an electrical chamber;
a fan wheel mounted for rotation within the airflow chamber, the fan wheel to be driven by a fan motor to generate a current of air passing through the airflow chamber;
a lamp supported by the housing, the lamp wired to an electrical circuit at least partially contained within the electrical chamber;
a trailer temperature sensor supported by the housing and being in temperature sensing relationship with the trailer; and
an indoor temperature sensor supported by the housing and being in temperature sensing relationship with indoor air of the building, wherein operation of the fan motor is in response to a temperature differential as sensed by the trailer temperature sensor the indoor temperature sensor.

21. The illuminating fan of claim 20, further including a metal heat sink in heat transfer relationship with the lamp and the airflow chamber through which the current of air is to pass.

22. The illuminating fan of claim 20, further including a metal heat sink in heat transfer relationship with the lamp and the airflow chamber through which the current of air is to pass, wherein the metal heat sink is a monolithic piece including a plurality of fins, a first surface, and a second surface, the first surface being disposed within the electrical chamber and the second surface being disposed within the airflow chamber.

23. The illuminating fan of claim 20, further including:
a metal heat sink in heat transfer relationship with the lamp and the airflow chamber through which the current of air is to pass; and
a unit temperature sensor in heat transfer relationship with at least one of the metal heat sink, the lamp, the housing, the electrical circuit, or the electrical chamber.

24. The illuminating fan of claim 20, further including a light sensor to be supported by the housing and aimed toward the trailer to sense a degree to which the trailer is illuminated, the lamp being supplied a lamp current based on a feedback signal from the light sensor, wherein the feedback signal varies based on the degree to which the trailer is illuminated.

25. The illuminating fan of claim 20, further including an end piece attached to the housing, the end piece being of a monolithic and see-through material, the end piece including a lens and a grill, wherein light emitted from the lamp is to pass through the lens, and the current of air is to exit the airflow chamber through the grill.

26. The illuminating fan of claim 20, further including a motion sensor to generate a first motion feedback signal indicative of an object within the trailer moving in a first direction away from the lamp, the motion sensor to generate a second motion feedback signal indicative of the object within the trailer moving in a second direction towards the lamp.

27. The illuminating fan of claim 26, wherein the lamp is to draw a first current in response to the first motion feedback signal and to draw a second current in response to the second motion feedback signal, the first current being greater than the second current.

28. An illuminating fan comprising:
a housing defining an airflow chamber and an electrical chamber divided by an internal wall of the housing;
a fan wheel mounted to rotate within the airflow chamber, the fan wheel to be driven by a fan motor to generate an air current to pass through the airflow chamber and out through a discharge outlet in a first direction; and
a lamp supported by the housing, the lamp to be powered via an electrical circuit at least partially contained within the electrical chamber, the lamp to project a beam of light in the first direction.

29. The illuminating fan of claim 28, further including:
a metal heat sink in heat transfer relationship with the lamp and the airflow chamber through which the air current is to pass; and
a unit temperature sensor in heat transfer relationship with at least one of the metal heat sink, the lamp, the housing, the electrical circuit, or the electrical chamber, wherein the illuminating fan has:
an inactive mode in which the lamp and the fan motor are de-energized;
a full power mode in which the lamp draws a maximum safe lamp current while the fan motor draws a maximum safe fan current;
a lighting mode in which the lamp draws the maximum safe lamp current while the fan motor draws a low fan current, the low fan current is less than 20% of the maximum safe fan current, the low fan current being greater than zero when the unit temperature sensor senses a temperature that exceeds a first threshold, and the low fan current being equal to zero when the unit temperature sensor does not sense the temperature exceeding the first threshold;
a ventilating mode in which the fan motor draws the maximum safe fan current while the lamp draws a minimum lamp current, the minimum lamp current is less than 20% of the maximum safe lamp current;
an intermediate lighting mode in which the lamp draws a moderate lamp current while the fan motor draws the low fan current, the moderate lamp current is greater than the minimum lamp current but less than the maximum safe lamp current;
an intermediate ventilating mode in which the fan motor draws a moderate fan current while the lamp draws the minimum lamp current, the moderate fan current is greater than the low fan current but less than the maximum safe fan current; and
an intermediate power mode in which the lamp draws an intermediate lamp current while the fan motor draws an intermediate fan current, the intermediate lamp current is greater than the minimum lamp current but no greater than the maximum safe lamp current, and the intermediate fan current is greater than the low fan current but no more than the maximum safe fan current.

30. The illuminating fan of claim 29, wherein the illuminating fan is to change from the lighting mode to the intermediate lighting mode in response to the unit temperature sensor sensing a temperature that exceeds a second threshold.

31. The illuminating fan of claim 28, further including a metal heat sink, the metal heat sink being a monolithic piece including a plurality of fins, a first surface, and a second surface, the first surface being disposed within the electrical chamber and the second surface being disposed within the airflow chamber.

32. The illuminating fan of claim 28, wherein the illuminating fan is part of a loading dock arrangement for use with a building with a doorway, and a trailer parked at the doorway of the building, the loading dock arrangement including a bracket to mount the illuminating fan to the building proximate the doorway, the illuminating fan further including:
a trailer temperature sensor supported by the housing to be in temperature sensing relationship with the trailer; and
an indoor temperature sensor supported by the housing to be in temperature sensing relationship with indoor air of the building, wherein the fan motor is to operate at a level based on a temperature differential as sensed by the trailer temperature sensor and the indoor temperature sensor.

33. The illuminating fan of claim 28, further including an end piece attached to the housing, the end piece being of a monolithic and see-through material, the end piece including a lens and a grill, wherein light emitted from the lamp to pass through the lens, the air current to exit the airflow chamber through the grill.

34. The illuminating fan of claim 28, further including a motion sensor to detect a direction of motion of an object relative to the lamp, a brightness of the lamp to vary based on whether the direction of motion of the object is moving towards the lamp or away from the lamp.

* * * * *